United States Patent
Matsui

(10) Patent No.: US 12,058,462 B2
(45) Date of Patent: Aug. 6, 2024

(54) IMAGE CAPTURING APPARATUS

(71) Applicant: CANON KABUSHIKI KAISHA, Tokyo (JP)

(72) Inventor: Tsukasa Matsui, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 141 days.

(21) Appl. No.: 17/933,270

(22) Filed: Sep. 19, 2022

(65) Prior Publication Data

US 2023/0086374 A1 Mar. 23, 2023

(30) Foreign Application Priority Data

Sep. 22, 2021 (JP) ................. 2021-154712

(51) Int. Cl.
*H04N 25/76* (2023.01)
*H04N 25/50* (2023.01)

(52) U.S. Cl.
CPC ............ *H04N 25/76* (2023.01); *H04N 25/50* (2023.01)

(58) Field of Classification Search
CPC .... H04N 25/713; H04N 25/53; H04N 25/773; H04N 25/76; H04N 25/50; H04N 25/40; H04N 25/78
USPC .................................................. 348/207.99
See application file for complete search history.

(56) References Cited

U.S. PATENT DOCUMENTS

| | | | |
|---|---|---|---|
| 9,210,350 | B2 | 12/2015 | Dai |
| 2015/0163429 | A1* | 6/2015 | Dai ............... H04N 25/581 348/295 |
| 2019/0182442 | A1* | 6/2019 | Ikedo ............... H04N 25/42 |
| 2020/0036918 | A1* | 1/2020 | Ingle ............ H01L 27/14625 |
| 2020/0053266 | A1* | 2/2020 | Ogushi ............ G03B 19/023 |

\* cited by examiner

*Primary Examiner* — Lin Ye
*Assistant Examiner* — Chan T Nguyen
(74) *Attorney, Agent, or Firm* — Canon U.S.A., Inc. I.P. Division

(57) ABSTRACT

An image capturing apparatus comprising: a plurality of SPAD pixels arrayed two-dimensionally; and a plurality of signal processing units that are provided so as to correspond, respectively, to the plurality of SPAD pixels, wherein each of the plurality of signal processing units comprises a request unit configured to issue a readout request in accordance with detection of a predetermined numbers of photons by the corresponding SPAD pixel, and an arbitration unit configured to select and output one of one or more readout requests issued by the request unit and another readout request received from another signal processing unit, The image capturing apparatus further comprises a request detection unit configured to detect the readout request output by the arbitration unit, where the request detection unit detects and counts the readout requests issued in a predetermined period.

13 Claims, 10 Drawing Sheets

IMAGE CAPTURING APPARATUS

BACKGROUND

Field

The present disclosure relates to an image capturing apparatus.

Description of the Related Art

There is known a photoelectric conversion apparatus that digitally counts the number of incoming photons to an avalanche photodiode and outputs, from a pixel, a digital signal obtained by photoelectrically converting the count value. In terms of noise and signal calculation processing, digitization of a pixel signal has a great advantage, and image capturing apparatuses in which a plurality of pixels for outputting photoelectrically converted digital signals are arrayed have become popular.

U.S. Pat. No. 9,210,350 discloses a method of, if the counted number of photons reaches a threshold value within a time period shorter than one frame, measuring the time and obtaining the number of photons per frame from the time information and the number of photons.

In the method of obtaining the number of photons per frame disclosed in U.S. Pat. No. 9,210,350, a photon counter and a time measurement unit are provided for each pixel, and photon counting and time measurement are started at the start of exposure. If the photon counter reaches a threshold value within a time shorter than the exposure time of one frame, the number of photons per frame is calculated by calculating "the photon threshold value×(the exposure time of one frame/the time until reaching the threshold value)". Since a predetermine value is set for each of the photon threshold value and the exposure time of one frame, when the time until reaching the threshold value is known, that is, when the photon counter reaches the threshold value, the number of photons per frame of the pixel is determined. In addition, since the number of photons per frame is calculated as described above, it can be seen that a pixel whose photon counter reaches the threshold value has a certain level of brightness or more as compared to a pixel whose photon counter does not reach the threshold value.

In general, brightness adjustment of an image is performed based on readout pixel values. However, in a conventional technique, since the brightness is calculated after readout is complete for all pixels, the brightness is reflected on the exposure condition with a delay of one frame or more.

SUMMARY

Various embodiments of the present disclosure provide a technique for grasping brightness information of an image at the end of the exposure time of one frame, thereby implementing brightness adjustment in the next frame.

According to one embodiment of the present disclosure, there is provided an image capturing apparatus comprising: a plurality of SPAD pixels arrayed two-dimensionally; and a plurality of signal processing units that are provided so as to correspond, respectively, to the plurality of SPAD pixels, wherein each of the plurality of signal processing units comprises a request unit configured to issue a readout request in accordance with detection of a predetermined numbers of photons by the corresponding SPAD pixel, and an arbitration unit configured to select and output one of one or more readout requests issued by the request unit and another readout request received from another signal processing unit, wherein the image capturing apparatus further comprises a request detection unit configured to detect the readout request output by the arbitration unit, and the request detection unit detects and counts the readout request issued in a predetermined period.

Further features of the present disclosure will become apparent from the following description of example embodiments (with reference to the attached drawings).

DESCRIPTION OF THE EMBODIMENTS

Figure 1:
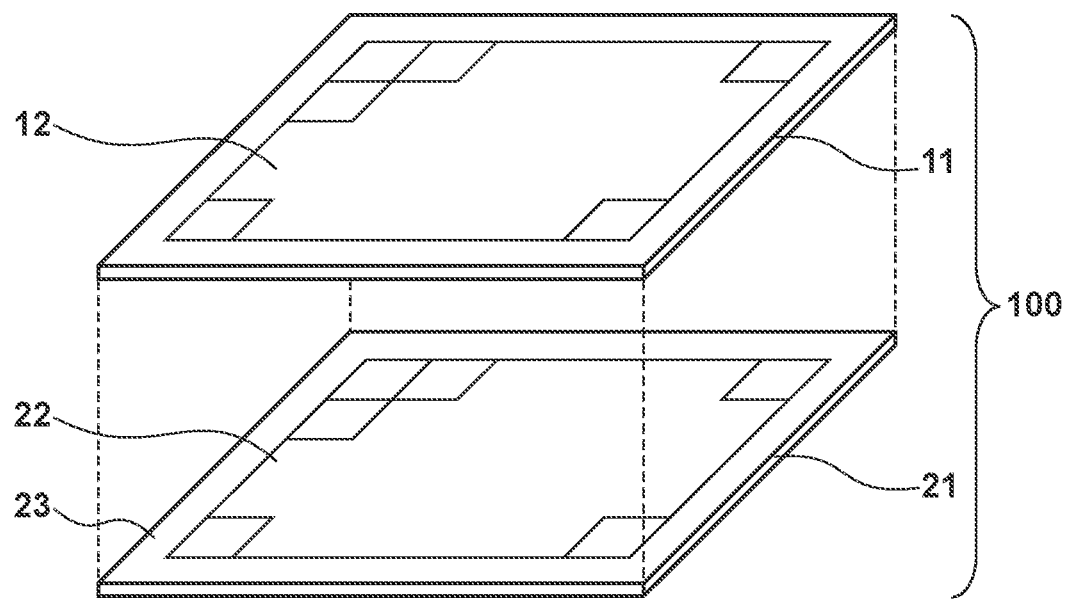
FIG. 1 is a view showing an arrangement example of an image capturing apparatus according to the first embodiment.

Hereinafter, embodiments will be described in detail with reference to the attached drawings. Note that the following embodiments are not intended to limit the scope of the claimed invention. Multiple features are described in the embodiments, but limitation is not made to embodiments that require all such features, and multiple such features may be combined as appropriate in an embodiment. Furthermore, in the attached drawings, the same reference numerals are given to the same or similar configurations, and redundant description thereof is omitted.

First Embodiment

In this embodiment, an example will be described in which, in two-dimensionally arrayed pixels, each pixel issues a readout request to perform readout. The pixel whose pixel counter reaches a threshold value within the image capturing time issues a readout request, and the count values of respective pixels are read out at collective readout, thereby acquiring brightness information faster than in a conventional technique. With this, it is possible to perform brightness adjustment in the next frame.

<Arrangement Example of Image Capturing Apparatus>

FIG. 1 is a view showing an arrangement example of an image capturing apparatus according to this embodiment. An image capturing apparatus 100 is formed by stacking two chips of a sensor chip 11 and a circuit chip 21 and electrically connecting them. The sensor chip 11 includes a pixel region 12. The circuit chip 21 includes a pixel circuit region 22 for processing a signal detected in the pixel region 12, and a control circuit region 23 for reading out a signal from the pixel circuit region 22.

<Arrangement Example of Sensor Chip>

Figure 2:
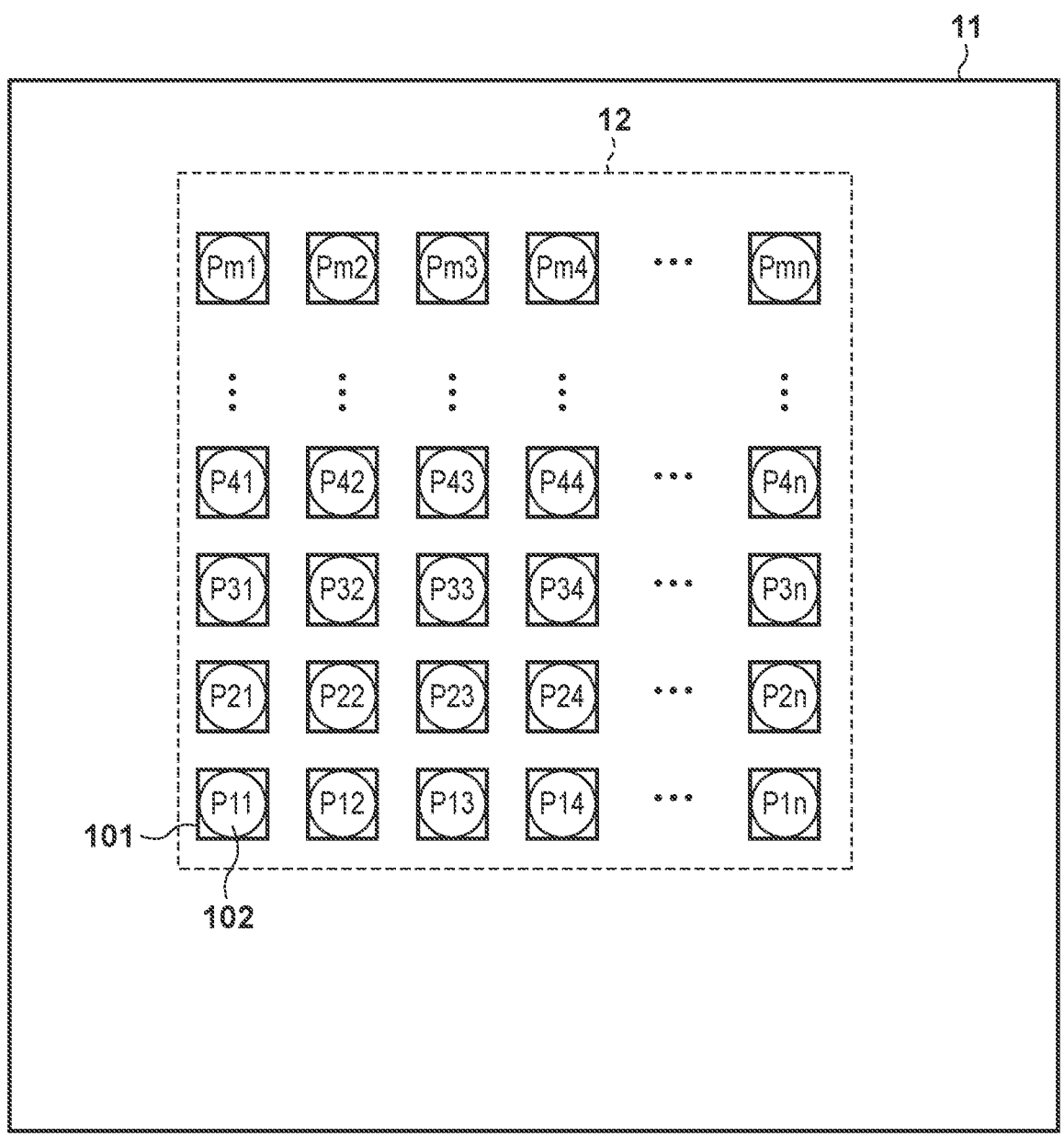
FIG. 2 is a view showing an arrangement example of a sensor chip according to the first embodiment.

FIG. 2 is a view showing an arrangement example of the sensor chip 11 included in the image capturing apparatus according to this embodiment. The pixel region 12 of the sensor chip 11 includes a plurality of pixels 101 two-dimensionally arrayed over a plurality of rows and a plurality of columns. Each pixel 101 includes a photoelectric conversion unit 102 with, for example, an avalanche photodiode (to be referred to as APD hereinafter). The pixel 101 is, for example, a SPAD (Single Photon Avalanche Diode) pixel. In FIG. 2, m×n pixels 101 arranged in m rows from the first row to the mth row and n columns from the first column to the nth column are represented using numbers indicating the row number and the column number. For example, the unit pixel 101 arranged in the first row and the third column is represented by "P13". Note that the numbers of rows and columns of the pixel array forming the pixel region 12 are not particularly limited.

<Arrangement Example of Circuit Chip>

Figure 3:
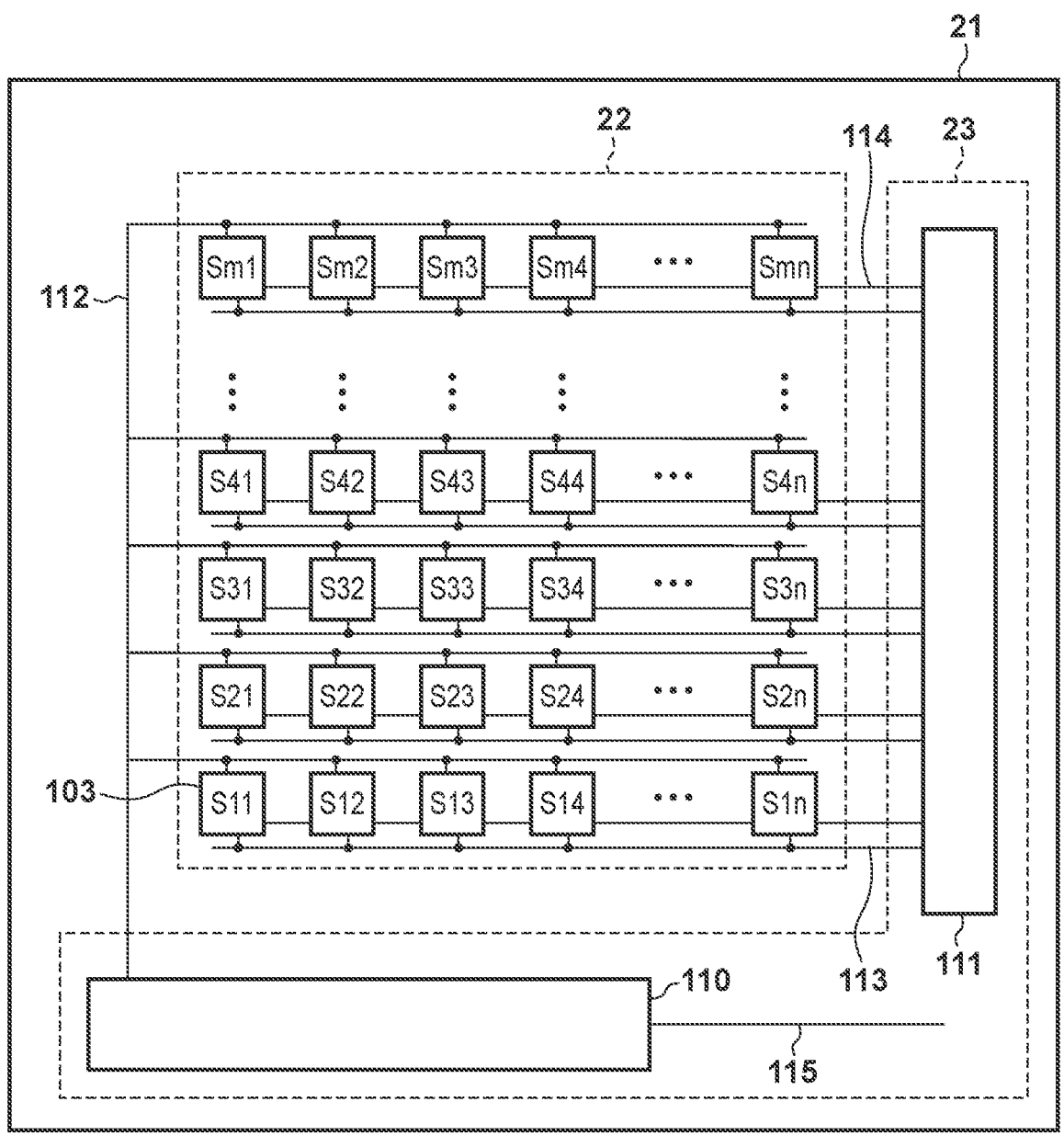
FIG. 3 is a view showing an arrangement example of a circuit chip according to the first embodiment.

FIG. 3 is a view showing an arrangement example of the circuit chip 21 included in the image capturing apparatus 100 according to this embodiment. The circuit chip 21 includes the pixel circuit region 22 and the control circuit region 23. The pixel circuit region 22 includes a plurality of signal processing units 103 two-dimensionally arrayed over a plurality of rows and a plurality of columns. In FIG. 3, some of m×n signal processing units 103 arranged from the first row to the mth row and from the first column to the nth column are represented using numbers indicating the row number and the column number. For example, the signal processing unit 103 arranged in the first row and the third column is represented by "S13". Note that the numbers of rows and columns of the signal processing unit array forming the pixel circuit region 22 are not particularly limited.

The control circuit region 23 includes a control pulse generation circuit 110 and a signal readout circuit 111. Each row of the signal processing unit array of the pixel circuit region 22 extends in the first direction (the horizontal direction in FIG. 3), and a control line 112 and a data signal line 113 are arranged in each row. The control line 112 and the data signal line 113 are connected to each of the signal processing units 103 arranged in the first direction. The first direction in which the control line 112 extends will sometimes be referred to as the row direction or the horizontal direction hereinafter. Furthermore, in each row of the signal processing unit array of the pixel circuit region 22, a readout request signal line 114 is connected in the form in which the signal processing units 103 in the first direction are connected.

The control line 112 of each row is connected to the control pulse generation circuit 110. The control pulse generation circuit 110 provides a control signal for driving the signal processing unit 103 to the signal processing unit 103 via the control line 112. The control pulse generation circuit 110 and the signal readout circuit 111 are connected via a control line 115. The control pulse generation circuit 110 provides, via the control line 115, a control signal for driving the signal readout circuit 111 in synchronism with the signal processing unit 103. The control pulse generation circuit 110 may generate a control signal based on an external trigger (not shown) or an internal signal.

The data signal line 113 and the readout request signal line 114 of each row are connected to the signal readout circuit 111. The data signal line 113 is a signal line for transmitting data held by the signal processing unit 103. Here, data includes a pixel counter value and a time count value, and details thereof will be described later. The readout request signal line 114 is a signal line for transmitting a readout request issued by each signal processing unit 103. In response to the readout request of the readout request signal line 114, the signal readout circuit 111 acquires a plurality of data from the data signal line 113.

<Equivalent Circuits and Block Diagrams>

Figure 4:
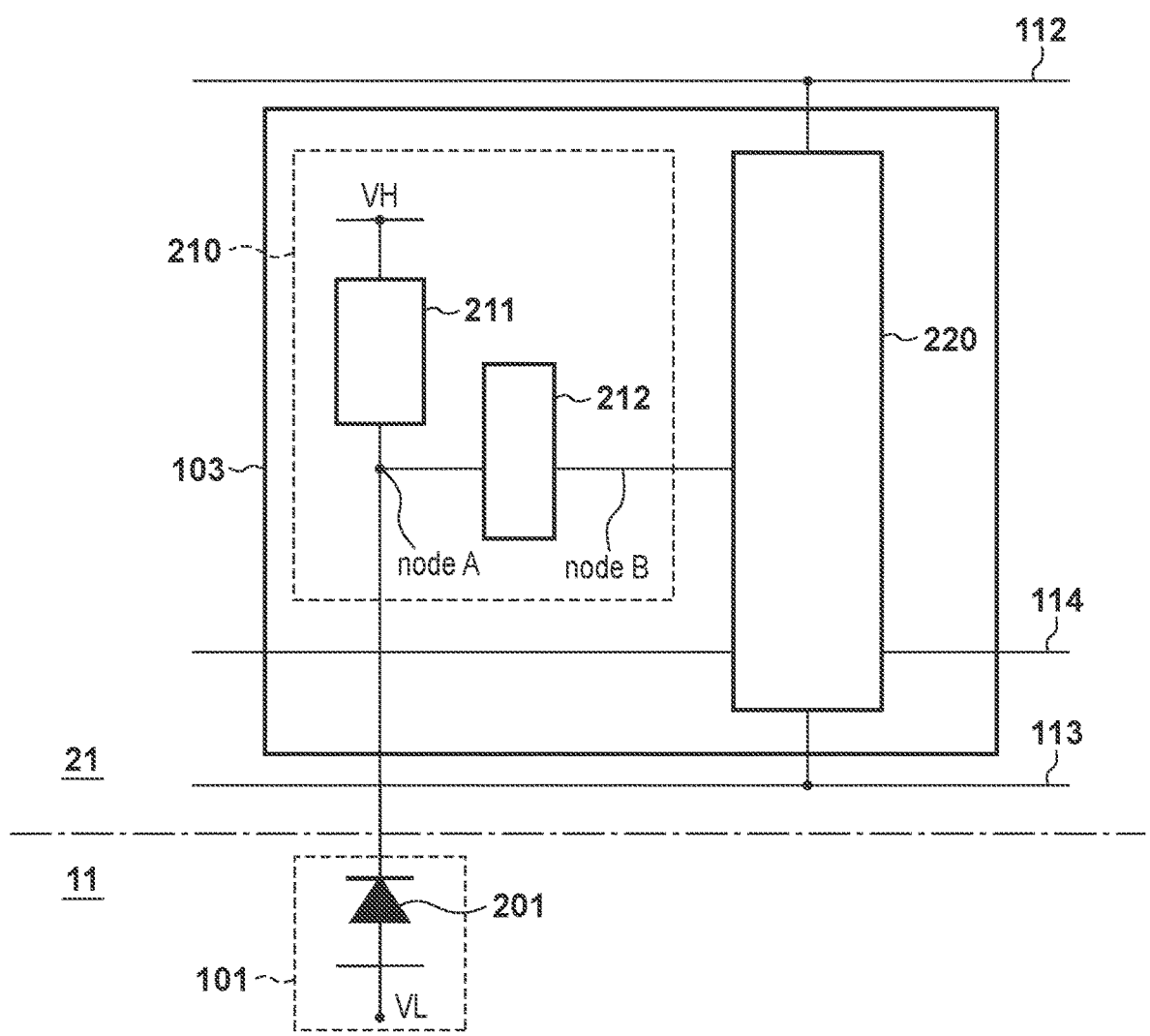
FIG. 4 is a view showing an example of equivalent circuits and block diagrams of a pixel and a signal processing unit according to the first embodiment.

Subsequently, FIG. 4 is a view showing an example of equivalent circuits and block diagrams of the pixel 101 shown in FIG. 2 and the signal processing unit 103 shown in FIG. 3.

The pixel 101 in the sensor chip 11 includes an APD 201 serving as a photoelectric conversion unit. When light enters the APD 201, charge pairs corresponding to the incident light are generated by photoelectric conversion. The anode of the APD 201 is provided with a voltage VL (first voltage). The cathode of the APD 201 is provided with a voltage VH (second voltage) higher than the voltage VL provided to the anode. The anode and the cathode are provided with a reverse bias voltage that causes the APD 201 to perform an avalanche multiplication operation. By setting the state in which such voltage is provided, charges generated by the incident light cause avalanche multiplication, thereby generating an avalanche current.

Note that when a reverse bias voltage is provided, there are two modes of a Geiger mode, which is operated in a state in which the potential difference between the anode and the cathode is larger than the breakdown voltage, and a linear mode, which is operated in a state in which the potential difference between the anode and the cathode is around or smaller than the breakdown voltage. An APD operated in the Geiger mode is called a SPAD. For example, the voltage VL (first voltage) is −30 V, and the voltage VH (second voltage) is 1 V.

The signal processing unit 103 in the circuit chip 21 includes a pulse generation unit 210 and a pulse processing unit 220.

The pulse generation unit 210 includes a quenching element 211 and a waveform shaping unit 212. The quenching element 211 is connected to the APD 201 and a power supply for providing the voltage VH. The quenching element 211 has a function of replacing, by a voltage signal, a change of the avalanche current generated in the APD 201. The quenching element 211 functions as a load circuit (quenching circuit) at the time of signal multiplication by avalanche multiplication, and serves to suppress avalanche multiplication by suppressing the voltage provided to the APD 201 (quenching operation).

The waveform shaping unit 212 outputs a pulse signal by shaping the potential change of the cathode of the APD 201 obtained at the time of detection of a photon. For the waveform shaping unit 212, for example, an inverter circuit or a buffer circuit is used.

Upon receiving a photon detection pulse generated by the pulse generation unit 210, the pulse processing unit 220 transfers the plurality of data via the data signal line 113. This will be described below in detail with reference to FIG. 5.

<Arrangement Example of Pulse Processing Unit>

Figure 5:
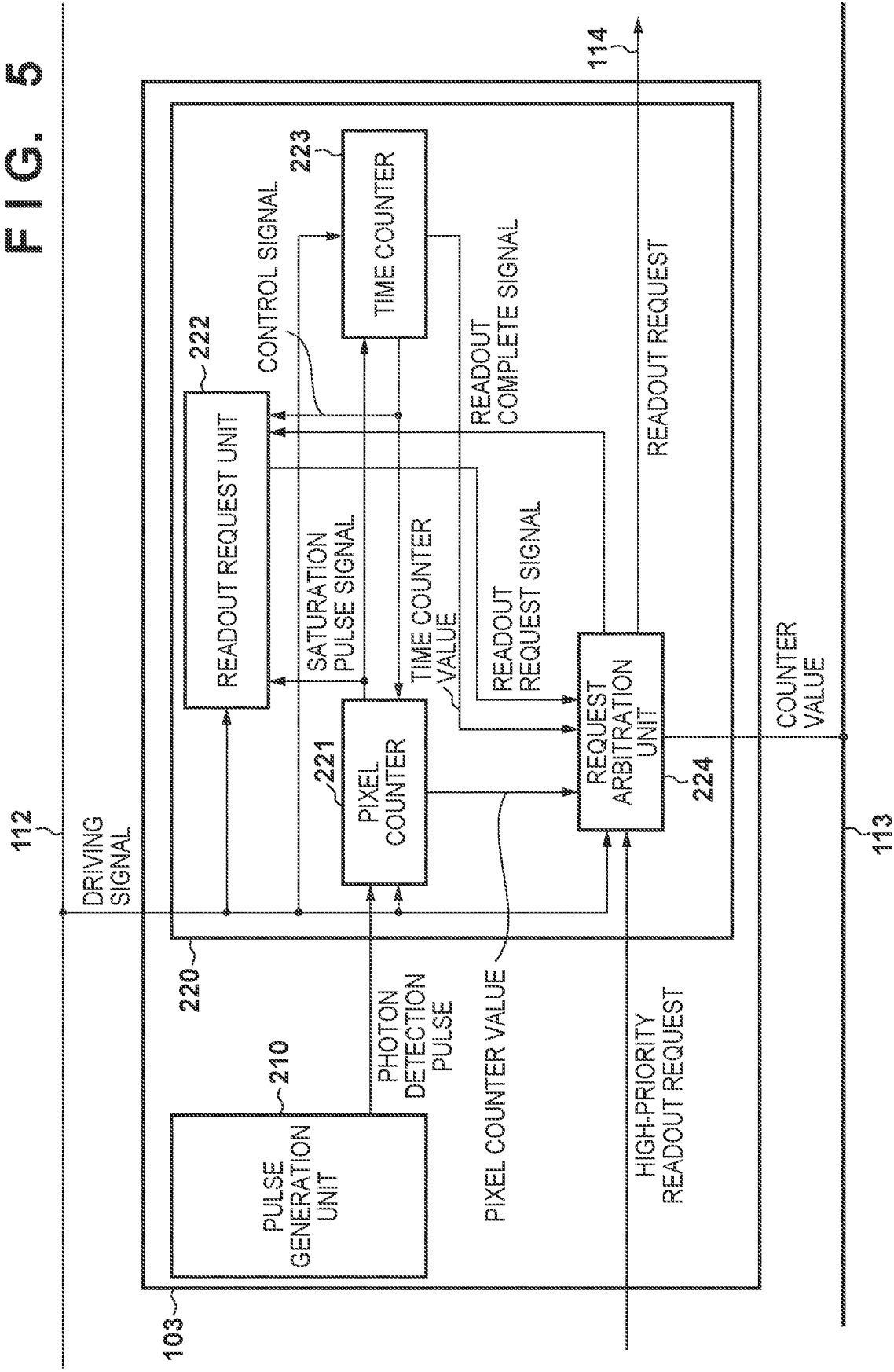
FIG. 5 is a block diagram showing an arrangement example of a pulse processing unit according to the first embodiment.

FIG. 5 is a block diagram showing an arrangement example of the pulse processing unit 220 according to this embodiment. The pulse processing unit 220 includes a pixel counter 221, a readout request unit 222, a time counter 223, and a request arbitration unit 224.

A driving signal received via the control line 112 is transmitted to the pulse processing unit 220 of each signal processing unit 103, and used to control the pixel counter 221, the readout request unit 222, the time counter 223, and the request arbitration unit 224. If the driving signal is valid (high), it indicates that image capturing is in progress. If the driving signal is invalid (low), it indicates that readout is in progress.

The pixel counter 221 counts the photons detected by the corresponding SPAD pixel. In accordance with the rise of the driving signal received via the control line 112, the pixel counter 221 starts to count the number of pulse signals output from the pulse generation unit 210. In accordance with the fall of the driving signal or the rise of a control signal output from the time counter 223, the pixel counter 221 stops counting and outputs a count value to the request arbitration unit 224. The pixel counter 221 is, for example, an 8-bit counter, and outputs a saturation pulse signal when a saturation value (all bits are "1") is reached. Note that the saturation pulse signal output from the pixel counter 221 may be issued when the count value exceeds a predetermined threshold value (or reaches the threshold value).

The readout request unit 222 issues a readout request when the corresponding SPDA pixel 101 detects a predetermined number of photons. The readout request unit 222 transmits the readout request to the request arbitration unit 224 in accordance with, for example, either of the rise of the saturation pulse signal output from the pixel counter 221 and the fall of the driving signal received via the control line 112. In addition, if the rise of the saturation pulse signal is detected, the readout request unit 222 transmits a request to read out a time counter value. If the rise of the saturation pulse signal is not detected, the readout request unit 222 transmits a request to read out a pixel counter value. Alternatively, the readout request unit 222 may be configured to transmit a readout request to the request arbitration unit 224 in accordance with either of the rise of the saturation pulse signal output from the pixel counter 221 and the rise of a control signal output from the time counter 223. Also in this case, if the rise of the saturation pulse signal is detected, the readout request unit 222 transmits a request to read out a time counter value. If the rise of the saturation pulse signal is not detected, the readout request unit 222 transmits a request to read out a pixel counter value.

The readout request unit 222 may be configured to issue a readout request if the value of the pixel counter 221 is equal to or larger than a threshold value at the time when the value of the time counter 223 reaches a threshold value.

The time counter 223 counts the time since the corresponding SPAR pixel starts to count the photons. The time counter 223 starts to count the time in accordance with the rise of the driving signal received via the control line 112. In addition, the time counter 223 stops counting in accordance with the fall of the driving signal or the rise of the saturation pulse signal output from the pixel counter 221, and outputs the time counter value to the request arbitration unit 224. The time counter 223 may issue a control signal when the time counter value exceeds a predetermined threshold value (or reaches the threshold value).

The request arbitration unit 224 selects and outputs one of the readout request issued from the readout request unit 222 and another readout request received from another signal processing unit. The request arbitration unit 224 controls the readout request in accordance with the presence/absence of a high-priority readout request from the signal processing unit 103 having a high priority level. Each signal processing unit 103 has a determined priority level. In FIG. 3, for example, the signal processing unit 103 (S11) at the left end has the highest priority level, and the priority level is lower as the column number advances in the horizontal direction from S12 to S13. This simplifies the wiring of the readout request signal line 114. The method of assigning the priority levels is not limited to this, as a matter of course. The signal processing unit 103 having the highest priority level performs the same operation as that in the arrangement example shown in FIG. 5 on the assumption that the readout request of the signal processing unit 103 having a high priority level always stops (low).

Subsequently, the method of controlling the readout request of the request arbitration unit 224 will be described. If no readout request is generated in this signal processing unit 103, the request arbitration unit 224 transmits intact a high-priority readout request from the signal processing unit 103 having a high priority level. If a readout request is generated in this signal processing unit 103 and the signal processing unit 103 having a high priority level also generates (high) a readout request at the same time, the request arbitration unit 224 transmits the readout requests to the signal readout circuit 111, and causes the readout request of this signal processing unit 103 to extend (continue). If the readout request from the signal processing unit 103 having a high priority level is stopped (low), it is determined that the readout request of this signal processing unit 103 is permitted, and the request arbitration unit 224 stops (low) the readout request signal. At the same time as the readout request signal is stopped, the request arbitration unit 224 outputs no count value if the driving signal received via the control line 112 is valid (high), or the request arbitration unit 224 outputs the count value to the data signal line 113 if the driving signal is invalid (low). The request arbitration unit 224 selects and outputs one of the count value of the pixel counter 221 and the count value of the time counter 223 based on the readout request signal output from the readout request unit 222.

<Connection Between Signal Readout Circuit and Signal Processing Unit>

Figure 6:
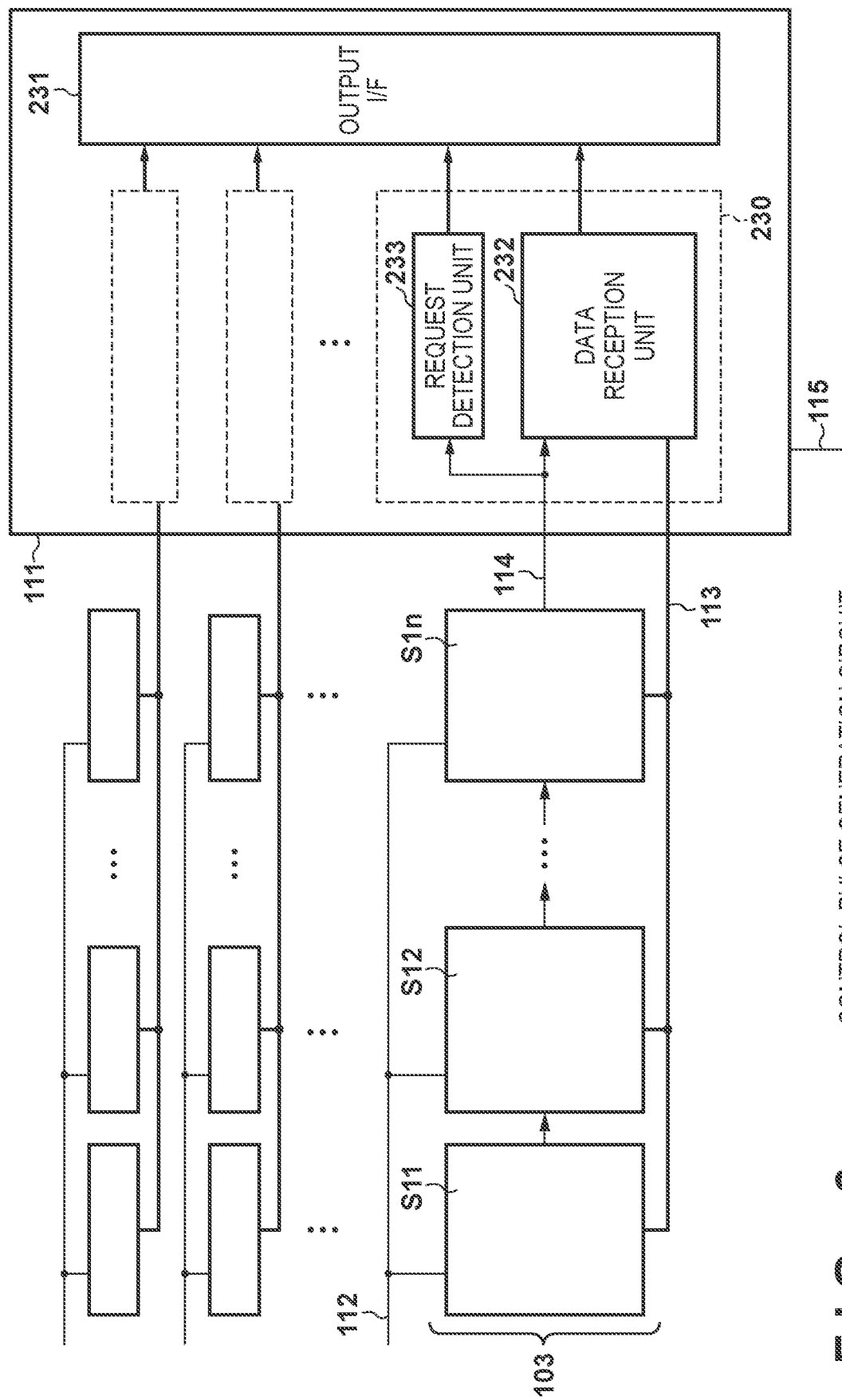
FIG. 6 is a block diagram showing the arrangement of a signal readout circuit and its connection to signal processing units according to the first embodiment.

FIG. 6 is a block diagram showing an arrangement example of the signal readout circuit 111 and its connection to the signal processing units 103 according to this embodiment. The signal readout circuit 111 includes a row readout circuit 230 connected for each row, and an output interface 231 for selecting an output of each row. The row readout circuit 230 includes a data reception unit 232 and a request detection unit 233.

The output interface 231 selects the row readout circuit of each row, and outputs the count value and the count value (request count) of the request detection unit 233 to the outside.

Upon receiving the readout request from the signal processing unit 103 via the readout request signal line 114, the data reception unit 232 acquires the pixel counter value or the time counter value of the data signal line 113.

The request detection unit 233 detects and counts the readout requests issued by a predetermined time since the start of image capturing. The count value of the request detection unit 233 indicates the number of saturation of the pixel counters by the predetermined time since the start of image capturing, that is, the number of pixels each having a certain level of brightness or more. By using this count value, it is possible to perform brightness adjustment in the next frame. As a brightness adjustment method, for example, exposure time adjustment is used. When increasing the brightness, the exposure time is increased. When decreasing the brightness, the exposure time is decreased or thinned out.

<Timing Chart>

Figure 7:
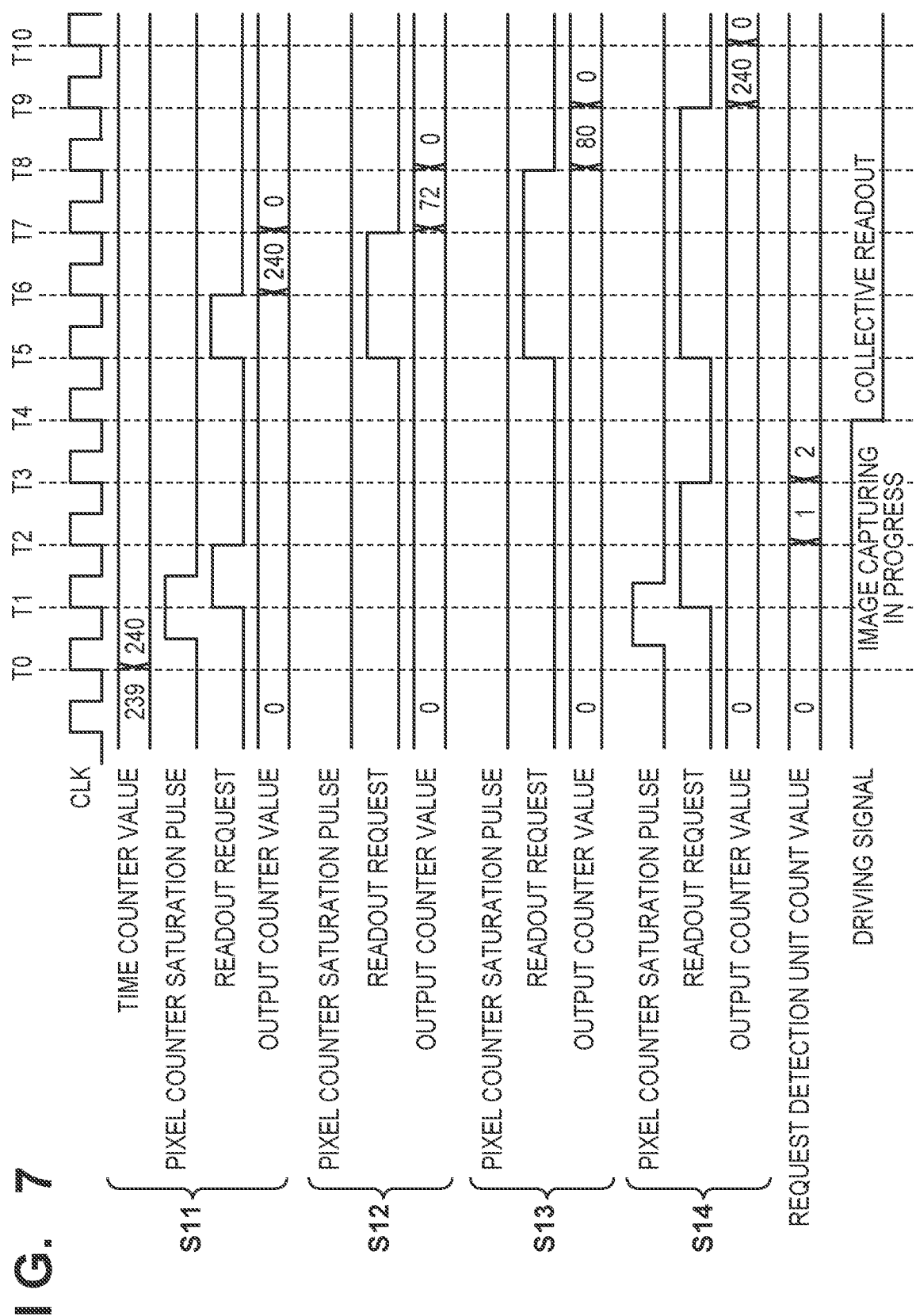
FIG. 7 is a timing chart showing the operations of the signal processing units and a row readout circuit according to the first embodiment.

FIG. 7 is a timing chart showing control of the readout requests in respective signal processing units 103 and the operation of the row readout circuit 230 according to this embodiment. The signal processing units S11 to S14 in the first row will be exemplified, and readout will not be performed for the remaining signal processing units 103. Note that the exemplified timing chart is merely an example of this embodiment, and this embodiment is not limited to the transition timings of signals in this timing chart.

Times T0 to T10 represent times at the rising edges of CLK.

Here, the procedure will be described in which, after the start of image capturing, only the pixel whose pixel counter is saturated by the end of image capturing issues a readout request, the number of the readout requests is counted, and collective readout of all the pixels is performed after the end of image capturing. Time T4 represents the image capturing end time. During a period from time T0 to time T4, in accordance with an instruction of the driving signal, the signal processing unit, among the signal processing units S11 to S14, whose pixel counter value exceeds the threshold value issues a readout request, and the request detection unit 233 counts the request. During a period from time T4 to time T10, an instruction to perform collective readout is issued to each pixel using the driving signal, so that each pixel issues a readout request and outputs a count value. Note that among the signal processing units S11 to S14, the number in the horizontal direction is smaller, the signal processing unit has a higher priority level for readout.

Each signal shown in FIG. 7 will be described first. A time counter value is the value of the time counter 223. The time counter of the signal processing unit S11 is extracted and shown in FIG. 7. A pixel counter saturation pulse is a signal issued by the pixel counter 221 upon receiving a pulse from the pulse generation unit 210. A readout request is a signal issued by the readout request unit 222 in synchronism with CLK upon receiving the pixel counter saturation pulse. An output counter value is a count value output by the request arbitration unit 224 of each pixel to the data signal line 113. A request detection unit count value is a count value of the requests issued and detected by time T4. A driving signal is a signal transmitted to each pixel via the control line 112. In this example, image capturing ends and a signal for performing collective readout is issued at time T4.

Behaviors of the signals at each time will be described below. At time T0, the time counter value changes from 239 to 240. Each of the signal processing units S11 and S14 issues a pixel counter saturation pulse at an arbitrary timing during a period from time T0 to time T1. In accordance with the pixel counter saturation pulse, the time counter 223 stops after time T1, so the time counter value does not change.

Upon receiving the pixel counter saturation pulse, the signal processing unit S11 issues a readout request at time T1. Since this signal processing unit is a signal processing unit having the highest priority level, it stops the readout request at time T2.

Upon receiving the pixel counter saturation pulse, the signal processing unit S14 issues a readout request at time T1. When the signal processing unit S11 stops the readout request at time T2, the signal processing unit S14 becomes the signal processing unit having the highest priority level at time T3. Accordingly, the signal processing unit S14 stops the readout request at time T3.

Since the signal processing units S12 and S13 do not output pixel counter saturation pulses by time T4, they do not issue readout requests until collective readout performed from time T5. The request detection unit 233 in the row readout circuit 230 detects and counts the request from the signal processing unit S11 at time T2 and the request from the signal processing unit S14 at time T3.

As the driving signal, a signal for performing collective readout is issued at time T4. Upon receiving this signal, the signal processing units S11, S12, S13, and S14 simultaneously issue readout requests at time T5. Since the pixel counters of the signal processing units S11 and S14 reach the threshold value by time T4, they output time counter values. On the other hand, since the pixel counters of the signal processing units S12 and S13 do not reach the threshold value, they output pixel counter values. Since the signal processing unit S11 is the signal processing unit having the highest priority level, it outputs a count value and ends issuance of the readout request at time T6.

Thereafter, among the processing units issuing the readout requests, the signal processing unit S12 has the highest priority level at time T7, the signal processing unit S13 has the highest priority level at time T8, and the signal processing unit S14 has the highest priority level at time T9. Thus, they sequentially output count values and end issuance of the readout requests.

As has been described above, in this embodiment, each pixel issues a readout request at the time when a pixel counter saturation pulse is output, and the number of the requests is counted. With this, it is possible to grasp the number of pixels whose pixel counters are saturated before performing collective readout of the pixels. That is, since each pixel issues a readout request when the number of photons of the pixel reaches the threshold value, by counting the number of requests, it is possible to grasp, at the end of the exposure time of one frame, the number of pixels in each of which the number of photons reached the threshold value within the exposure time of the one frame. Reaching the threshold value indicates that the brightness is a certain level or more. Therefore, this number can be used for brightness adjustment.

Conventionally, brightness information is acquired after collective readout of pixels, so brightness adjustment is not in time for the next frame (brightness adjustment is performed with a delay of one frame). On the other hand, in this embodiment, brightness information is acquired before collective readout of pixels, so that brightness adjustment can be performed in the next frame based on the information.

Second Embodiment

In the first embodiment, the arrangement has been described in which the pixel whose pixel counter reaches the threshold value within the image capturing time issues a readout request, and the count values of the respective pixels are read out at collective readout, so that brightness information can be acquired faster than a conventional technique. To the contrary, in this embodiment, an example will be described in which a storage unit (memory) for storing the count value of each pixel is added, and the pixel counter value is read out upon reaching a threshold. With this, it is possible to improve the frame rate in accordance with the brightness.

<Arrangement Example of Pulse Processing Unit>

Figure 8:
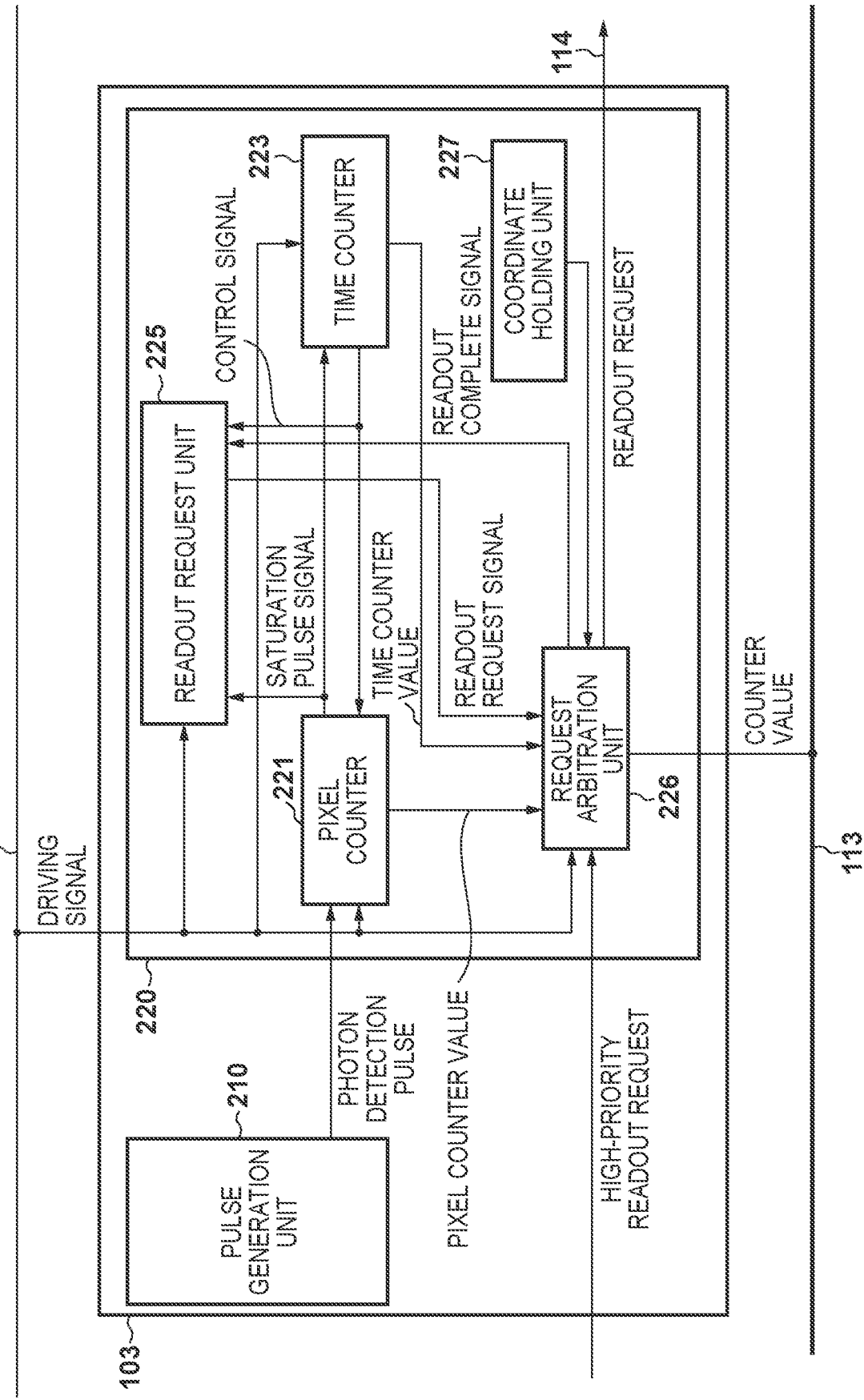
FIG. 8 is a block diagram showing an arrangement example of a pulse processing unit according to the second embodiment.

FIG. 8 is a block diagram showing an arrangement example of a pulse processing unit 220 according to this embodiment. Since the arrangement in this embodiment is similar to the arrangement according to FIGS. 1 to 4 in the first embodiment, a description thereof will be omitted.

The pulse processing unit 220 includes a pixel counter 221, a readout request unit 225, a time counter 223, a request arbitration unit 226, and a coordinate holding unit 227. Each of the pixel counter 221 and the time counter 223 performs the same operation as in the first embodiment, and is thus denoted by the same reference numeral, and a description thereof will be omitted.

With respect to one rise of a driving signal received via a control line 112, the readout request unit 225 transmits one readout request to the request arbitration unit 226 in accordance with either of the rise of a saturation pulse signal output from the pixel counter 221 and the fall of the driving signal. In the first embodiment, the readout request is issued twice at the time of saturation and at the time of collective readout. However, in this embodiment, it is configured such that a readout request is issued only once at either of the above times. In addition, if the rise of the saturation pulse signal is detected, the readout request unit 225 transmits a request to read out a time counter value. If the rise of the saturation pulse signal is not detected, the readout request unit 225 transmits a request to read out a pixel counter value.

Alternatively, the readout request unit 225 may be configured to transmit a readout request to the request arbitration unit 226 once in accordance with either of the rise of the saturation pulse signal output from the pixel counter 221 and the rise of a control signal output from the time counter 223. Also in this case, if the rise of the saturation pulse signal is detected, the readout request unit 225 transmits a request to read out a time counter value. If the rise of the saturation pulse signal is not detected, the readout request unit 225 transmits a request to read out a pixel counter value.

The request arbitration unit 226 is similar to the request arbitration unit 224 in terms of giving the priority level, so that a description thereof will be omitted.

Subsequently, the method of controlling the readout request of the request arbitration unit 226 will be described. If no readout request is generated in this signal processing unit 103, the request arbitration unit 226 transmits intact a high-priority readout request from a signal processing unit having a high priority level. If a readout request is generated in this signal processing unit and the signal processing unit having a high priority level also generates (high) a readout request at the same time, the request arbitration unit 226 transmits the readout request to a signal readout circuit 111, and causes the readout request of this signal processing unit to extend. If the readout request from the signal processing unit 103 having a high priority level is stopped (low), it is determined that the readout request of this signal processing unit is permitted. Then, the request arbitration unit 226 stops (low) the readout request signal, and outputs a count value and coordinate information to a data signal line 113. The request arbitration unit 226 selects and outputs one of the count value of the pixel counter 221 and the count value of the time counter 223 based on the readout request signal output from the readout request unit 225.

The coordinate holding unit 227 holds coordinate information of each pixel in a row or in a column in advance, and transmits the coordinate information to the request arbitration unit 226.

<Connection Between Signal Readout Circuit and Signal Processing Unit>

Figure 9:
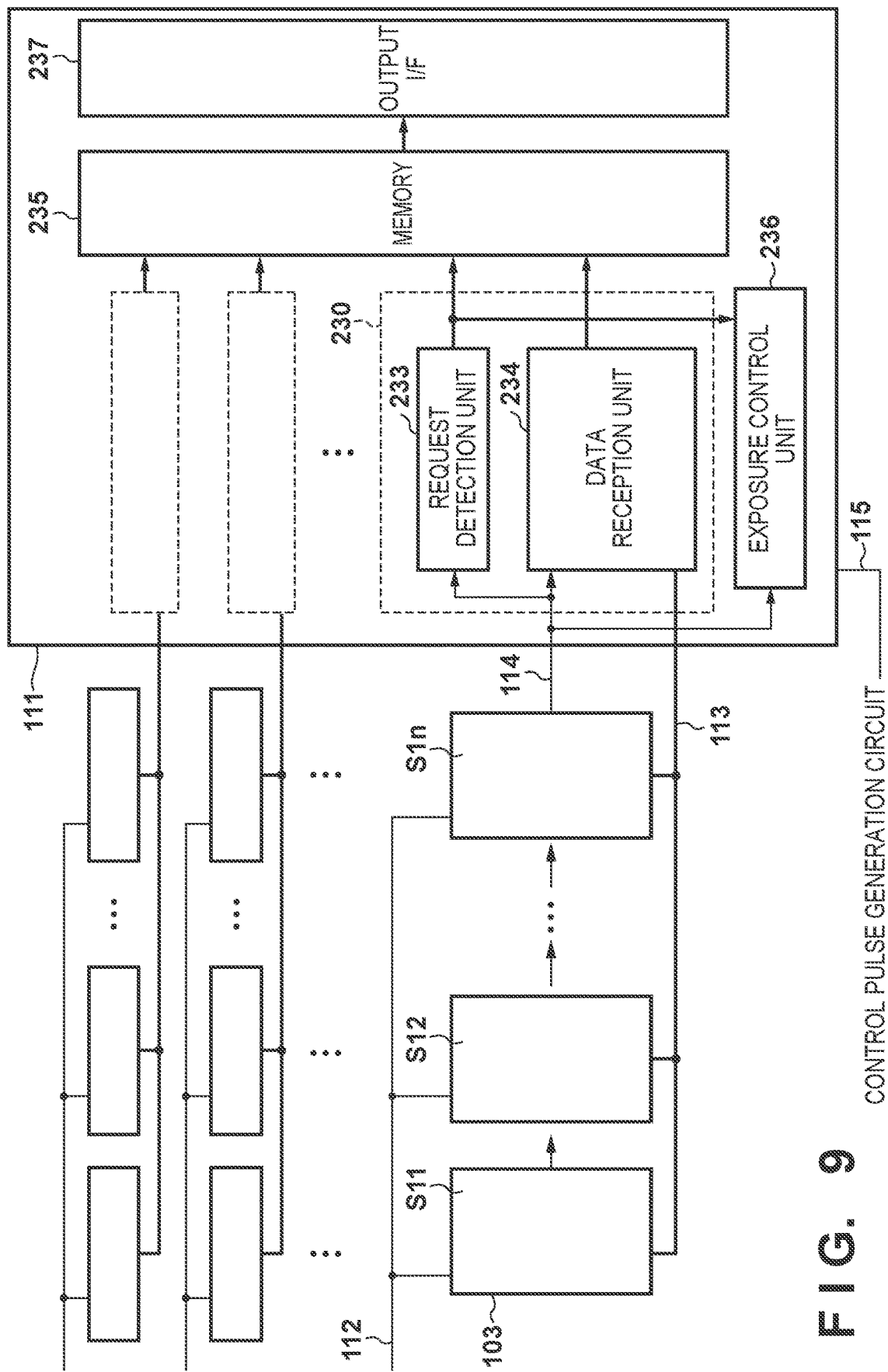
FIG. 9 is a block diagram showing the arrangement of a signal readout circuit and its connection to signal processing units according to the second embodiment.

FIG. 9 is a block diagram showing an arrangement example of the signal readout circuit 111 and its connection to the signal processing units 103 according to this embodiment.

The signal readout circuit 111 includes a row readout circuit 230 connected for each row, a memory 235 for storing a readout signal value, an exposure control unit 236, and an output interface 237. The row readout circuit 230 includes a data reception unit 234 and a request detection unit 233. The request detection unit 233 performs the same operation as in the first embodiment, and is thus denoted by the same reference numeral, and a description thereof will be omitted.

Upon receiving the readout request from the signal processing unit 103 via a readout request signal line 114, the data reception unit 234 acquires the count value of the data signal line 113 and the coordinate information of each pixel. Then, the count value of each pixel is stored in the memory 235 corresponding to the acquired coordinate information. Alternatively, the coordination information and count value may be stored together in the memory 235.

The memory 235 may be mounted for each row. With this arrangement, readout arbitration between rows can be avoided.

The exposure control unit 236 determines whether readout is complete for all the pixels with reference to the control signal transmitted via a control line 115 and the readout request signal line 114 for each row. If it is determined that readout is complete, the exposure control unit 236 requests a control pulse generation circuit 110 via the control line 115 to raise the driving signal to start next image capturing. If the exposure control unit 236 refers to the count value of the request detection unit 233 and the count value does not reach a predetermine threshold by a predetermined time, the exposure control unit 236 may request the control generation circuit 110 via the control line 115 to raise the driving signal to start next image capturing. That is, if the number of SPAR pixels read out in a predetermined period does not reach the threshold value, current exposure may be aborted and exposure in the next frame may be started.

If the exposure control unit 236 refers to the count value of the request detection unit 233 and the count value reaches the predetermined threshold value by the predetermined time, the exposure control unit 236 may request the control pulse generation circuit 110 via the control line 115 to fall the driving signal to read out the remaining pixels. After requesting the fall of the driving signal, as soon as readout of all the pixels is confirmed, the exposure control unit 236 may request the control pulse generation circuit 110 via the control line 115 to raise the driving signal to start next image capturing.

The output interface 237 refers to the memory 235 to output the count value and the count value of the request detection unit 233 to the outside.

<Timing Chart>

Figure 10:
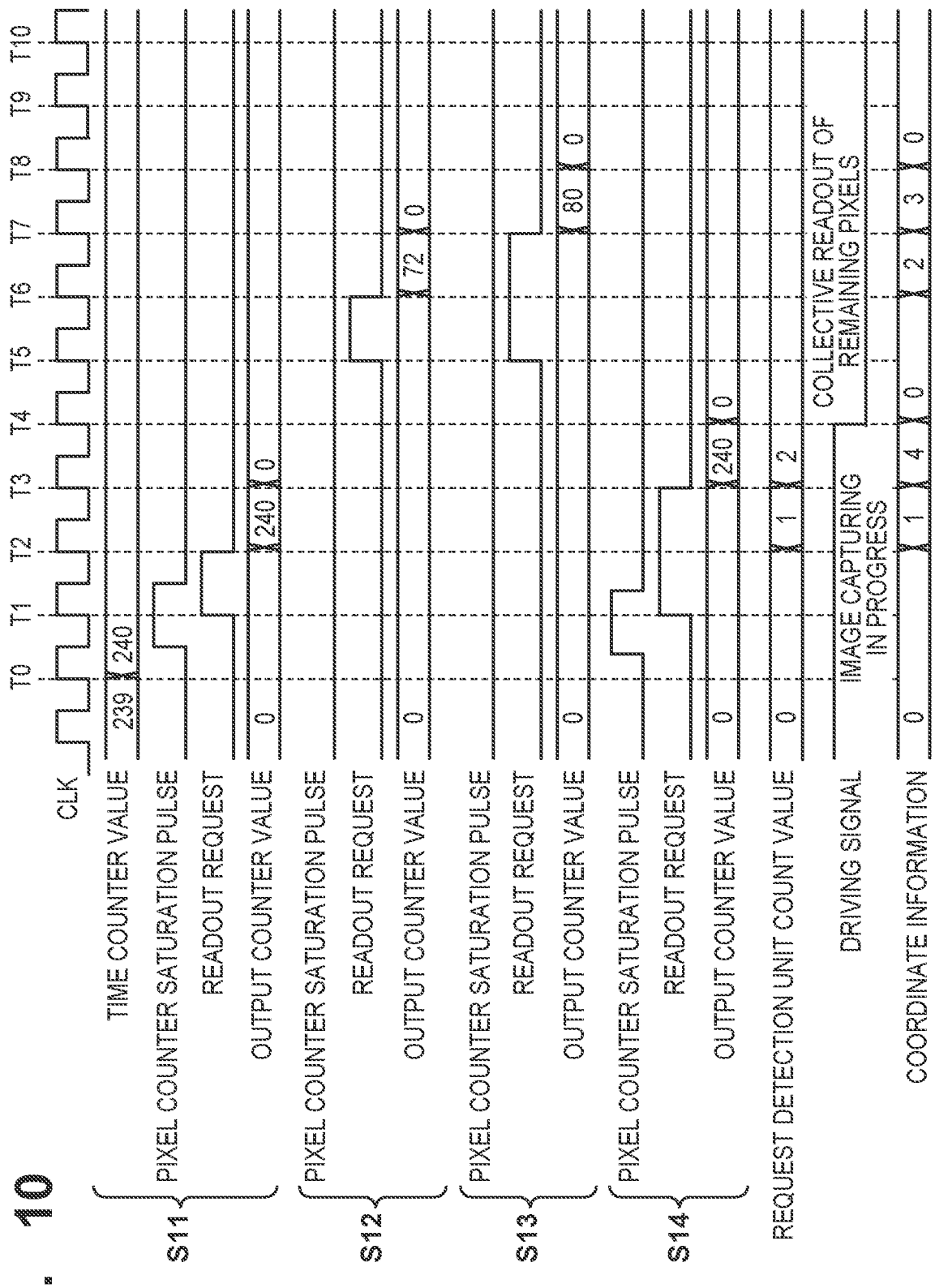
FIG. 10 is a timing chart showing the operations of the signal processing units and a row readout circuit according to the second embodiment.

FIG. 10 is a timing chart showing control of the readout requests in respective signal processing units 103 and the operation of the row readout circuit 230 according to this embodiment. The signal processing units S11 to S14 in the first row will be exemplified, and readout will not be performed for the remaining signal processing units 103. Note that the exemplified timing chart is merely an example of this embodiment, and this embodiment is not limited to the transition timings of signals in this timing chart.

Times T0 to T10 represent times at the rising edges of CLK. Here, the procedure will be described in which, after the start of image capturing, only the pixel whose pixel counter is saturated by the end of image capturing issues a readout request, the count value is stored in a corresponding portion of the memory based on the coordinate information, and collective readout of all the unread pixels is performed after the end of image capturing.

Time T4 represents the image capturing end time. During a period from time T0 to time T4, the signal processing unit, among the signal processing units S11 to S14, whose pixel counter value exceeds a threshold value issues a readout request and, based on a result of arbitration between the pixels, a count value and coordinate information are output. During a period from time T4 to time T10, an instruction to perform collective readout of unread pixels is issued to each pixels using the driving signal, so that each pixel issues a readout request and outputs a count value and coordinate information. Note that among the signal processing units S11 to S14, the number in the horizontal direction is smaller, the signal processing unit has a higher priority level for readout.

Each signal shown in FIG. 10 will be described first. A time counter value, a pixel counter saturation pulse, a readout request, an output count value, and a request detection unit count value are similar to those shown in FIG. 7 in the first embodiment, and a description thereof will be omitted. As the driving signal, a signal is output to cause the pixel whose pixel counter is saturated by time T4 to issue a readout request at the time of saturation and read out the count value and, from time T5, a signal is output to read out the count values of the remaining unread pixels. Coordinate information indicates the coordinate information of the pixel received by the data reception unit 234.

Behaviors of the signals at each time will be described below. Each of the signal processing units S11 and S14 issues a pixel counter saturation pulse at an arbitrary timing during a period from time T0 to time T1. Upon receiving the pixel counter saturation pulse, the signal processing unit S11 issues a readout request at time T1. Since this signal processing unit is a signal processing unit having the highest priority level, it outputs a time counter value and coordinate information at time T2, and ends issuance of the readout request.

Upon receiving the pixel counter saturation pulse, the signal processing unit S14 issues a readout request at time T1. When the signal processing unit S11 ends issuance of the readout request at time T2, the signal processing unit S14 becomes the signal processing unit having the highest priority level at time T3. Accordingly, the signal processing unit S14 outputs a time counter value and coordinate information, and ends issuance of the readout request at time T3.

Since the signal processing units S12 and S13 do not output pixel counter saturation pulses by time T4, they do not issue readout requests until collective readout performed from time T5. As the driving signal, a signal for performing collective readout is issued at time T4. Upon receiving the signal, the signal processing units S12 and S13 that have not output count values simultaneously issue readout requests at time T5.

Since the signal processing unit S12 is the signal processing unit having the highest priority level at time T6, the signal processing unit S12 outputs a pixel counter value and coordinate information, and ends issuance of the readout request. Thereafter, at time T7, the signal processing unit S13 becomes the signal processing unit having the highest priority level among the signal processing units issuing the readout requests. Accordingly, the signal processing unit S13 outputs a pixel counter value and coordinate information, and ends issuance of the readout request.

As has been described above, in this embodiment, the readout request is issued and the count value and the coordinate information are read out at the time when the pixel counter saturation pulse is output. Therefore, the number of pixels to be read out at the time when the image capturing ends and collective readout of the pixels is performed decreases. Conventionally, all the pixels are read out at the time of collective readout of the pixels. However, in this embodiment, the count value of the pixel whose pixel counter value reaches the threshold value is read out before the collective readout of the pixels. With this, the time required for the collective readout after the end of image capturing can be reduced. In addition, by starting exposure in the next frame ahead of schedule by the exposure control unit 236 after readout of the count values from the pixels is completed ahead of schedule, it is possible to improve the frame rate in accordance with the brightness at the time of image capturing.

Therefore, it is possible to improve the recognition accuracy by immediately reflecting exposure conditions in a situation of an in-vehicle camera or the like where the situation changes sequentially, and to improve the recognition response speed by improving the frame rate in a specific environment.

According to various embodiments of the present disclosure, it is possible to grasp brightness information of an image at the end of the exposure time of one frame, thereby implementing brightness adjustment in the next frame.

Other Embodiments

Various embodiment(s) of the present disclosure can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While example embodiments have been described, it is to be understood that the present disclosure is not limited to the disclosed example embodiments. The scope of the following claims is to be accorded the broadest interpretation so as to encompass all such modifications and equivalent structures and functions.

This application claims the benefit of Japanese Patent Application No. 2021-154712, filed Sep. 22, 2021, which is hereby incorporated by reference herein in its entirety.

What is claimed is:

1. An image capturing apparatus comprising:
   a plurality of SPAD pixels arrayed two-dimensionally; and
   a plurality of signal processing units that are provided so as to correspond, respectively, to the plurality of SPAD pixels,
   wherein each of the plurality of signal processing units comprises
   a request unit configured to issue a readout request in accordance with detection of a predetermined numbers of photons by the corresponding SPAD pixel, and
   an arbitration unit configured to select and output one of one or more readout requests issued by the request unit and another readout request received from another signal processing unit,
   wherein
   the image capturing apparatus further comprises a request detection unit configured to detect the readout request output by the arbitration unit, and
   the request detection unit detects and counts the readout request issued in a predetermined period.

2. The apparatus according to claim 1, wherein
   each of the plurality of signal processing units further comprises a pixel counter configured to count the photons detected by the corresponding SPAD pixel, and
   the request unit issues the readout request in a case where a value of the pixel counter reaches a threshold value.

3. The apparatus according to claim 1, wherein
   each of the plurality of signal processing units further comprises a time counter configured to count a time since the corresponding SPAD pixel starts to count the photons, and
   the request unit issues the readout request in a case where a value of the time counter reaches a threshold value.

4. The apparatus according to claim 1, wherein
   each of the plurality of signal processing units further comprises:
   a pixel counter configured to count the photons detected by the corresponding SPAD pixel, and
   a time counter configured to count a time since the corresponding SPAD pixel starts to count the photons, and
   in a case where a value of the pixel counter is not less than a threshold value when a value of the time counter reaches a threshold value, the request unit issues the readout request.

5. The apparatus according to claim 1, wherein
   the request unit controls issuance of the readout request based on an instruction from an outside.

6. The apparatus according to claim 1, wherein
   the request detection unit detects and counts the readout request issued during a period from a start of exposure of the image capturing apparatus to collective readout of the SPAD pixels, and outputs a count value of the number of the readout requests in accordance with the collective readout.

7. The apparatus according to claim 1, further comprising an exposure control unit configured to control a start of exposure in a next frame,
   wherein if the number of the readout SPAD pixels satisfies a predetermined condition, the exposure control unit starts exposure in the next frame.

8. The apparatus according to claim 7, wherein
   if readout of all the SPAD pixels is complete, the exposure control unit starts exposure in the next frame.

9. The apparatus according to claim 7, wherein
   if the number of the SPAD pixels read out in a predetermined period does not reach a threshold value, the exposure control unit aborts current exposure and starts exposure in the next frame.

10. The apparatus according to claim 1, further comprising
    an exposure control unit configured to control a start of exposure in a next frame,
    wherein if the number of the SPAD pixels read out by a predetermined time reaches a threshold value, the exposure control unit starts readout of remaining unread pixels based on an instruction from an outside and, as soon as readout of all the SPAD pixels is complete, starts exposure in a next frame.

11. The apparatus according to claim 1, wherein
    each of the plurality of signal processing units further comprises:
    a pixel counter configured to count photons detected by the corresponding SPAD pixel,
    a time counter configured to count a time since the corresponding SPAD pixel starts to count the photons, and
    a coordinate holding unit configured to hold coordinate information of the corresponding SPAD pixel, and
    wherein the arbitration unit is configured to output the coordinate information and one of a value of the pixel counter or a value of the time counter.

12. The apparatus according to claim 11, further comprising:
    a data reception unit configured to receive the coordinate information and one of the value of the pixel counter or the value of the time counter output by the arbitration unit; and
    a storage unit configured to store the coordinate information and one of the value of the pixel counter or the value of the time counter in association with the coordinate information.

13. An image capturing apparatus including an image sensor in which a plurality of detection pixels each configured to detect a photon are arranged, the image capturing apparatus comprising:
    for each of the plurality of detection pixels, a pixel circuit including a pixel counter configured to count the number of photons detected by the detection pixel;
    a readout circuit configured to acquire a count result of the pixel counter and, based on the acquired count result, decide a pixel value of the corresponding detection pixel; and
    a control circuit configured to acquire the number of detection pixels, from among the plurality of detection pixels, which has detected a predetermined number of photons before the count result is acquired by the readout circuit, and decide an image capturing condition of the image sensor based on the acquired number of detection pixels.

* * * * *